3,305,593
DEHYDROGENATION OF CYCLOOCTENE

Robert E. Rinehart, Rutherford, and Ronald W. Fuest, Wayne, N.J., assignors to United States Rubber Company, New York, N.Y., a corporation of New Jersey
No Drawing. Filed June 24, 1965, Ser. No. 466,839
5 Claims. (Cl. 260—666)

This invention relates to the preparation of 1,5-cyclooctadiene from cyclooctene. 1,5-cycloocadiene has utility as a monomer in the manufacture of EPDM rubber and as an intermediate for the preparation of other organic chemicals such 1,2,5,6-cyclooctanetetrol.

We have found that rhodium salts, e.g. rhodium chloride, in methanol can be used to dehydrogenate selectively the readily available cyclooctene to a complex of rhodium chloride-1,5-cyclooctadiene of the formula $(RhClC_8H_{12})_2$. The rhodium chloride-1,5-cyclooctadiene complex may be decomposed by suitable reagents, e.g. aqueous alkali metal cyanide solution, to give highly pure 1,5-cyclooctadiene.

In carrying out the invention, the cyclooctene and rhodium salt and methanol are heated within the temperature range from 50° C. to 150° C. The time of heating is not critical and will generally be from one hour to 5 days. The dehydrogenation of cyclooocetene to rhodium chloride-1,5-cyclooctadiene complex may be accompanied by reduction of a portion of the rhodium chloride to free rhodium metal, but this may be reduced or eliminated by using a large excess of cyclooctene over the stoichiometric amount required for formation of the complex. A large amount of methane gas is produced from the hydrogenolysis of the methanol by hydrogen from the cyclooctene. In general the amount of cyclooctene will be from 1 to 20 moles per mole of rhodium salt. From 2 to 50 parts by weight of methanol per part of cyclooctene will generally be used. The rhodium salts that may be used are the salts of conventional acids, such as rhodium chloride, bromide, iodide, sulfate, acetate, nitrate and the like, rhodium chloride being preferred. The 1,5-cyclooctadiene may be recovered from the complex by treatment with strong field ligands, such as soluble metal cyanides, soluble metal thiocyanates, or organic phosphines, arsines, and stibines e.g., trialkyl phosphines, arsines, stibines, etc. and triphenyl phosphine, arsine and stibine.

The following illustrates the invention.

Example 1

A solution of 1 g. (0.0038 mole) of rhodium chloride trihydrate and 0.88 g. (0.008 mole) of cyclooctene in 5 ml. of methanol was heated in a sealed tube at an internal temperature of approximately 85°–95° C. for 7.8 hours. The tube was then cooled to room temperature, opened, and the reaction mixture was filtered. The solid residue (consisting of the free rhodium metal and the complex) was triturated with 20 ml. of carbon disulfide, filtered, and the residue was washed with an additional 10 ml. of carbon disulfide. The filtrate and washings were combined and evaporated to dryness in vacuo. The residue was recrystallized from a minimum amount of glacial acetic acid. There was obtained 0.33 g. (34% yield) of the yellow complex; M.P. 232–236° C. (with decomposition). The infrared spectrum was identical to that of an authentic sample prepared from rhodium chloride and authentic 1,5-cyclooctadiene. A sample of the complex prepared from cyclooctene was treated with aqueous KCN to release the olefin. Analysis of the olefin by gas-liquid chromatography (300 ft. capillary column, coated with squalane) showed 99.94% 1,5-cyclooctadiene; 0.06% cyclooctene.

Example 2

Example 1 was repeated with a reaction time of 3.8 hours. The yield of complex was 0.33 g. (34%). The yield of free rhodium metal was 50%.

Example 3

In a run similar to Example 1, a solution of 0.5 g. (0.0019 mole) of rhodium chloride trihydrate and 0.88 g. (0.008 mole) cycloctene in 5 ml. of methanol was heated at 85°–95° C. for 35 hours. The yield of complex was 0.16 g. (33%). The yield of free rhodium metal was 20%.

Example 4

In a run similar to Example 1, a solution of 1 g. (0.0038 mole) of rhodium chloride trihydrate and 4.4 g. (0.04 mole) of cyclooctene in 20 ml. of methanol was heated at 65° C. for 21 hours. The yield of complex was 0.536 g. (57%). There was no free rhodium metal.

Example 5

In a run similar to Example 1, a solution of 1 g. (0.0038 mole) of rhodium chloride trihydrate and 1.76 g. (0.016 mole) of cyclooctene in 20 ml. of methanol was heated at 65° C. for 66 hours. The yield of complex freed from metal was 0.3 g. (37%).

Example 6

In a run similar to Example 1, a solution of 1 g. (0.0038 mole) of rhodium chloride trihydrate and 0.88 g. (0.008 mole) of cyclooctene in 20 ml. of methanol was heated at 65° C. for 17.3 hours. The yield of complex freed from metal was 0.17 g. (18%).

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of dehydrogenating cyclooctene to 1,5-cyclooctadiene which comprises heating a solution of cyclooctene and a rhodium salt in methanol at a temperature from 50° C. to 150° C.

2. The method of dehydrogenating cyclooctene to 1,5-cyclooctadiene which comprises heating a solution of cyclooctene and rhodium chloride trihydrate in methanol at a temperature from 50° C. to 150° C.

3. The method of claim 1 in which the amount of cyclooctene is from 1 to 20 moles per mole of rhodium salt and the amount of methanol is 2 to 50 parts by weight per part of cyclooctene.

4. The method of preparing 1,5-cyclooctadiene from cyclooctene which comprises heating a solution of cyclooctene and a rhodium salt in methanol at a temperature of 50° C to 150° C. to form a complex of the rhodium salt and 1,5-cyclooctadiene, and recovering 1,5-cyclooctadiene from said complex.

5. The method of preparing 1,5-cyclooctadiene from cyclooctene which comprises heating a solution of cyclooctene and rhodium chloride in methanol at a temperature from 50° C. to 150° C. to form a rhodium chloride-1,5-cyclooctadiene complex, and recovering 1,5-cyclooctadiene from said complex by treatment with a soluble metal cyanide.

References Cited by the Examiner

FOREIGN PATENTS 1,318,312  2/1963  France.
937,276    9/1963  Great Britain.

OTHER REFERENCES

R. Rinehart: J. American Chemical Society; 86, pages 2516–2518, 1964.

DELBERT E. GANTZ, *Primary Examiner.*

V. O'KEEFE, *Assistant Examiner.*